United States Patent [19]
Yau et al.

[11] Patent Number: 5,199,976
[45] Date of Patent: Apr. 6, 1993

[54] OZONE-FRIENDLY CORRECTION FLUID

[75] Inventors: Chiou C. Yau, Wrentham; Norman G. Sanborn, South Weymouth; Kim H. Ng, Franklin, all of Mass.

[73] Assignee: The Gillette Company, Boston, Mass.

[21] Appl. No.: 850,598

[22] Filed: Mar. 13, 1992

Related U.S. Application Data

[63] Continuation-in-part of Ser. No. 802,208, Dec. 4, 1991, abandoned, which is a continuation-in-part of Ser. No. 714,489, Jun. 13, 1991, abandoned.

[51] Int. Cl.$^5$ .................... C09D 10/00; B32B 35/00
[52] U.S. Cl. .................. 106/19 A; 106/30 R; 427/140
[58] Field of Search .............. 106/19, 30; 427/140

[56] References Cited

U.S. PATENT DOCUMENTS

| 3,674,729 | 7/1972 | Mirick | 524/556 |
| 3,997,498 | 12/1976 | Reese et al. | 106/30 |
| 4,165,988 | 8/1979 | Page et al. | 106/191 |
| 4,654,081 | 3/1987 | Dalzell | 106/23 |
| 4,732,614 | 3/1988 | Brooks et al. | 106/21 |
| 4,833,117 | 5/1989 | Brook et al. | 503/201 |

FOREIGN PATENT DOCUMENTS

| 254587 | 3/1988 | Fed. Rep. of Germany . |
| 58-2363 | 1/1983 | Japan . |
| 63227 | 10/1983 | Japan . |
| 180568 | 10/1983 | Japan . |
| 024765 | 2/1984 | Japan . |
| 193973 | 11/1984 | Japan . |
| 8376 | 1/1985 | Japan . |
| 116694 | 1/1985 | Japan . |
| 174274 | 8/1986 | Japan . |
| 289568 | 12/1986 | Japan . |
| 001763 | 1/1987 | Japan . |
| 56283 | 3/1987 | Japan . |
| 195067 | 8/1987 | Japan . |
| 102709 | 1/1988 | Japan . |
| 63-142075 | 6/1988 | Japan . |
| 142076 | 6/1988 | Japan . |
| 223075 | 9/1988 | Japan . |
| 331013 | 7/1989 | Japan . |
| 261473 | 10/1989 | Japan . |
| 292074 | 11/1989 | Japan . |
| 099570 | 4/1990 | Japan . |
| 105876 | 4/1990 | Japan . |
| 169678 | 6/1990 | Japan . |
| 3937 | 7/1990 | Japan . |
| 2-185577 | 7/1990 | Japan . |
| 2-209973 | 8/1990 | Japan . |
| 0891730 | 12/1981 | U.S.S.R. . |

OTHER PUBLICATIONS

Pliolite, The Solution Resins; Good Year Chemicals.

Primary Examiner—Mark L. Bell
Assistant Examiner—Helene Klemanski
Attorney, Agent, or Firm—Fish & Richardson

[57] ABSTRACT

An ozone-friendly correction fluid includes a non-halogenated solvent, a vinyl toluene-butadiene copolymer as the polymeric film-forming material, a dispersing agent, and an opacifying agent.

22 Claims, No Drawings

OZONE-FRIENDLY CORRECTION FLUID

BACKGROUND OF THE INVENTION

This application is a continuation-in-part of U.S. Ser. No. 07/802,208 filed, Dec. 4, 1991, now abandoned which is a continuation-in-part of U.S. Ser. No. 07/714,489, now abandoned filed Jun. 13, 1991.

The invention relates to correction fluids.

Correction fluids for correcting handwritten, typewritten or photocopy markings on paper are well known and their performance characteristics are well defined. Essential performance characteristics include the ability to provide a film or coalesced residue on drying which can both effectively cover erroneous markings on a paper surface and receive a corrected marking. Preferably, the film covering the marking should be strongly bonded to the paper surface and should also be sufficiently flexible so that the film will not be removed under normal conditions of handling. Additionally, the correction fluid should not interact with the marking to cause excessive discoloration of the resulting film (bleeding). Another important performance characteristic involves the drying rate of the composition which should be as rapid as possible so that corrections can be made relatively quickly. Normally, commercial correction fluids form films which are sufficiently dry to receive a corrected marking in about 30-40 seconds.

Correction fluids typically are a dispersion, i.e., a suspension of solid particles in a liquid. When a correction fluid sits around for some length of time the solid particles begin to settle, causing the fluid near the bottom of the container to become more compact. Compact settling is undesirable because it is no longer easily redispersed thereby reducing coverage or the ability of the fluid to cover markings.

Correction fluids typically include some standard ingredients, including an opacifying agent, a film-forming polymeric material, a volatile solvent, and a dispersing agent. The opacifying agent is the solid that is dispersed in the fluid and provides the basic white color which can be toned with other pigments to provide a correction fluid closely corresponding to the color of the paper to which the fluid is to be applied. The film-forming polymeric material is substantially soluble in the selected solvent and binds pigment to paper and helps to form the flexible but solid covering that remains once the solvent evaporates. The volatile solvent is a carrier for all ingredients mentioned herein. The dispersing agent is included to stabilize the dispersion, i.e., to help ensure that the opacifying agent remains uniformly dispersed in the solvent.

Historically, halogenated hydrocarbons have been the solvents of choice for correction fluid compositions. Halogenated hydrocarbon solvents present special advantages primarily because they have evaporation rates which provide correction fluids that dry rapidly and completely. Additionally, they do not interact with typewritten markings to cause unacceptable bleeding. Also, they can effectively dissolve those film-forming polymeric materials which provide durable but flexible films without causing excessive cockling or distortion of paper surfaces. Despite their recognized advantages when used as correction fluid solvents, the use of halogenated hydrocarbon solvents has become a matter of increased concern primarily because of their adverse effect on the environment (stratospheric ozone depletion). Accordingly, providing an "ozone-friendly" correction fluid by eliminating the use of halogenated hydrocarbon solvents from correction fluids has become a primary objective for the art and significant efforts have been directed to the development of correction fluids free of halogenated hydrocarbon solvents. By ozone-friendly correction fluid, we mean a correction fluid which either does not contain a material that migrates to the stratosphere or, if it contains such a material, the material does not cause a reduction in the ozone concentrations.

SUMMARY OF THE INVENTION

The invention features, in one aspect, a correction fluid that includes a volatile, non-halogenated solvent; a vinyl toluene-butadiene copolymer as a film-forming material; a dispersing agent; and an opacifying agent such as titanium dioxide. By volatile, it is meant that the solvent has a boiling point of less than 155° C.

The invention features, in another aspect, a correction fluid that includes a volatile, non-halogenated cyclohexane or alkylated cyclohexane containing 10 or fewer carbon atoms as a solvent; a film-forming polymeric material; an alkyl sodium sulfosuccinate as a dispersing agent; and an opacifying agent.

The invention features, in yet another aspect, a correction fluid that includes a volatile, non-halogenated cyclohexane or alkylated cyclohexane containing 10 or fewer carbon atoms as a solvent; a film-forming polymeric material; a polymeric fatty ester as a dispersing agent; a plasticizer for the polymeric material; and an opacifying agent.

The preferred dispersing agents include dialkyl sodium sulfosuccinates. Examples of preferred agents include dioctyl sodium sulfosuccinate and bistridecyl sodium sulfosuccinate.

Preferred solvents include methylcyclohexane, ethylcyclohexane, and dimethylcyclohexane; the most preferred solvent is methylcyclohexane. The solvent can also be a blend of cyclohexane or an alkylated cyclohexane and other hydrocarbons; preferably, such blends include at least 50% of the cyclohexane or alkylated cyclohexane by weight.

The preferred correction fluid includes between 35% and 55% by weight solvent; between 4% and 12% by weight copolymer; between 1% and 3.5% by weight dispersing agent; and between 35% and 55% by weight opacifying agent.

The correction fluid provides excellent coverage without bleeding typed originals, writing inks, and copies. Importantly, the fluid exhibits excellent pigment redispersibility after long term storage. Also, because a non-halogenated solvent is employed in the fluid, it is ozone-friendly.

Other features and advantages of the invention will be apparent from the description of the preferred embodiment thereof, and from the claims.

DESCRIPTION OF THE PREFERRED EMBODIMENT

The preferred correction fluid includes methylcyclohexane as the solvent; vinyl toluene-butadiene copolymer as the film-forming material; dioctyl sodium sulfosuccinate as the dispersing agent; titanium dioxide as the opacifying agent; lampblack as a pigment to color match paper; mustard oil as a deterrent; and a fragrance.

A sufficient amount of methylcyclohexane should be included to make the fluid thin enough to be easily spread. So much should not be used so that the hiding power of the fluid diminishes. Preferably, the correction fluid should include 35%–55% by weight methylcyclohexane.

The preferred vinyl toluene-butadiene copolymer has a weight-average molecular weight of between 78,000 and 152,000, and is available from Goodyear Chemicals. A sufficient amount of the material should be included to provide good flexibility to the covering, but not so much that the viscosity of the fluid becomes too high, which can lead to reduced coverage and difficult brushing. The present correction fluid can also contain an effective amount of a plasticizer to improve flexibility of the cured copolymer. Preferred plasticizers are dialkyl phthalate compounds and a most preferred plasticizer is Jayflex ® (DTDP) brand ditridecyl phthalate plasticizer distributed by Exxon Chemical. Preferably, the correction fluid includes between 4% and 12% of the copolymer.

The preferred dialkyl sodium sulfosuccinate, dioctyl sodium sulfosuccinate, is sold under the tradename AEROSOL OTS by American Cyanamid Co. The preferred polymeric fatty ester is sold under the tradename HYPERMER LP1 by ICI Specialty Chemicals. A sufficient amount of the agent should be included to achieve complete dispersion of the titanium dioxide, but not so much should be included that the hiding power is reduced. The preferred fluid includes between 1% and 3.5% dioctyl sodium sulfosuccinate by weight. Bistridecyl sodium sulfosuccinate (sold under the tradename AEROSOL TR70 by American Cyanamid Co.) can also be used.

Suitable titanium dioxide pigments include commercially available rutile titanium dioxides and anatase titanium dioxides or blends or mixtures of these which preferably have an average particle size between about 0.2 to about 0.4 microns and an average oil absorption of about 14 lbs. oil/100 lbs. pigment to about 36 lbs./100 lbs. The amount of titanium dioxide included in the composition can vary depending on the degree of coverage desired. However, amounts between about 30 to about 60 percent by weight titanium dioxide based on total weight of composition are generally suitable. Other opacifying pigments may be used either alone but preferably in combination with the titanium dioxide. Such pigments include zinc sulfide and zinc oxide. Preferably the fluid includes between 35% and 55% of the opacifying agent by weight.

Lamp black is included as a coloring pigment to match the color of fluid to standard white paper. Other pigments such as raw umber or yellow oxide can also be included to match the tone of colored paper.

A small amount (0.2–0.2%) of mustard oil is included as a deterrent.

A small amount of a fragrance is included in the preferred formula to help mask the odor of the methylcyclohexane. Preferred is Fragrance 759292/D60218 S, which is available from Haarmann & Reimer.

Examples of preferred correction fluids are the following:

EXAMPLE 1

| Ingredients | Weight Percent |
| --- | --- |
| Methylcyclohexane | 46.6 |
| Vinyl toluene-butadiene copolymer | 7.7 |
| Dioctyl sodium sulfosuccinate | 2.2 |
| Titanium dioxide | 43.3 |
| Lamp black | .1 |
| Mustard oil | .1 |
| | 100.0 |

EXAMPLE 2

| Ingredients | Weight Percent |
| --- | --- |
| Methylcyclohexane | 49.478 |
| Vinyl toluene-butadiene copolymer (Pliolite VT) | 8.300 |
| Dioctyl sodium sulfosuccinate | 2.200 |
| Titanium dioxide (Ti-Pure R931, available from DuPont) | 39.788 |
| Lamp black | .070 |
| Mustard oil | .140 |
| Fragrance 759292/D60218 S | .025 |
| | 100.000 |

EXAMPLE 3

| Ingredients | Weight Percent |
| --- | --- |
| Methylcyclohexane | 38.575 |
| Odorless Mineral Spirits | 5.900 |
| Vinyl toluene-butadiene copolymer | 7.300 |
| Polymeric fatty ester (Hypermer LP1) | 2.000 |
| Titanium dioxide | 44.400 |
| Lamp Black | 0.070 |
| Mustard Oil | 0.130 |
| Fragrance | 0.025 |
| Ditridecyl phthalate (Jayflex (DTDP)) | 1.600 |
| | 100.000 |

EXAMPLE 4

| Ingredients | Weight Percent |
| --- | --- |
| Methylcyclohexane | 42.486 |
| Odorless mineral spirits | 5.821 |
| Vinyl toluene-butadiene copolymer (Pliolite VT) | 8.476 |
| Dioctyl sodium sulfosuccinate | 2.247 |
| Titanium dioxide (Ti-Pure R931) | 40.645 |
| Mustard oil | 0.135 |
| Lamp black | 0.056 |
| Raw umber | 0.076 |
| Yellow Oxide | 0.034 |
| Fragrance 759292/D60218 S | 0.024 |
| | 100.000 |

Correction fluids containing the above ingredients are prepared by first dissolving the vinyl toluene-butadiene polymer in methylcyclohexane. Next, the dioctyl sodium sulfosuccinate or polymeric fatty ester dispersant and titanium dioxide opacifying agent are added and the mixture dispersed for 3 hours in a bead mill, after which colorants, mustard oil, fragrance, and other ingredients are added to obtain final fluid composition.

Other embodiments are within the claims. For example, in addition to the most preferred ingredients the composition may also include various additives known to those skilled in the art. These additives are incorporated to improved specific properties. These include plasticizers to improved dry film adhesion and flexibility, flattening agents to control film gloss, flow additives and thickeners to control brushing, leveling and settling and pigment extenders to reduce cost. Moreover, other dialkyl sodium sulfosuccinates, in particular those with alkyl groups having less than 5 or 20 carbon atoms, can be used in place of dioctyl sodium sulfosuccinate.

We claim:

1. An ozone-friendly correction fluid comprising:
   a non-halogenated solvent;
   a film-forming polymeric material comprising a vinyl toluene-butadiene copolymer;
   a dispersing agent; and
   an opacifying agent.

2. The correction fluid of claim 1 wherein said solvent comprises a cyclohexane or any alkylated cyclohexane containing 10 or fewer carbon atoms.

3. The correction fluid of claim 2 wherein said solvent is methylcyclohexane.

4. The correction fluid of claim 2 wherein said solvent is dimethylcyclohexane.

5. The correction fluid of claim 2 wherein said solvent is ethylcyclohexane.

6. The correction fluid of claim 1 wherein said dispersing agent is a dialkyl sodium sulfosuccinate.

7. The correction fluid of claim 6 wherein said dispersing agent is dioctyl sodium sulfosuccinate.

8. The correction fluid of claim 7 comprising between 35% and 55% of said solvent by weight; between 4% and 12% of said copolymer by weight; between 1% and 3.5% of said dioctyl sodium sulfosuccinate by weight; and between 35% and 55% of said opacifying agent by weight.

9. The correction fluid of claim 8 wherein said solvent is methylcyclohexane.

10. The correction fluid of claim 1 wherein said film-forming polymeric material is vinyl toluene-butadiene copolymer with a weight-average molecular weight between 78,000 and 152,000.

11. The correction fluid of claim 10 further comprising a plasticizer.

12. The correction fluid of claim 11 wherein said plasticizer is dialkyl phthalate.

13. The correction fluid of claim 12 wherein said plasticizer is ditridecyl phthalate.

14. The correction fluid of claim 13 wherein said dispersing agent is a polymeric fatty ester.

15. The correction fluid of claim 1 wherein the opacifying agent is titanium dioxide.

16. The correction fluid of claim 15 wherein said solvent is a blend of said cyclohexane or said alkylated cyclohexane with other hydrocarbons, said blend comprising at least 50% of said cyclohexane or said alkylated cyclohexane by weight.

17. An ozone-friendly correction fluid comprising:
   a solvent comprising cyclohexane or an alkylated cyclohexane containing 10 or fewer carbon atoms;
   a film-forming polymeric material comprising a vinyl toluene-butadene copolymer;
   a dispersing agent comprising an alkyl sodium sulfosuccinate; and
   an opacifying agent.

18. The correction fluid of claim 17 wherein said film-forming polymeric material comprises a vinyl toluene-butadiene copolymer.

19. The correction fluid of claim 18 wherein said solvent is methylcyclohexane.

20. The correction fluid of claim 18 wherein said dispersing agent is a dialkyl sodium sulfosuccinate.

21. The correction fluid of claim 20 wherein said dispersing agent is dioctyl sodium sulfosuccinate.

22. The correction fluid of claim 20 comprising between 35% and 55% of said solvent by weight; between 4% and 12% of said film-forming polymeric material by weight; between 1% and 3.5% of said dispersing agent; and between 35% and 55% of said opacifying agent by weight.

* * * * *

UNITED STATES PATENT AND TRADEMARK OFFICE
CERTIFICATE OF CORRECTION

PATENT NO. : 5,199,976
DATED : April 6, 1993
INVENTOR(S) : Chiou C. Yau, Norman G. Sanborn, and Kim H. Ng It is certified that error appears in the above-indentified patent and that said Letters Patent is hereby corrected as shown below:

Col. 3, line 55; "(0.2-0.2%)" should be --(0.1-0.2%)--.

Signed and Sealed this

Fourth Day of October, 1994

Attest:

BRUCE LEHMAN

Attesting Officer     Commissioner of Patents and Trademarks